June 29, 1965  SAKAE OHISHI  3,191,424

DEVICE FOR MEASURING MICROHARDNESS OF MATERIALS

Filed Oct. 24, 1961

INVENTOR.
SAKAE OHISHI
BY
ATTORNEY

United States Patent Office 3,191,424
Patented June 29, 1965

3,191,424
DEVICE FOR MEASURING MICROHARDNESS OF MATERIALS
Sakae Ohishi, Bunkyo-ku, Tokyo, Japan, assignor to Nippon Rogaku K.K., Tokyo, Japan, and Cohen Co., Ltd., Yokohama-shi, Japan, both corporations of Japan
Filed Oct. 24, 1961, Ser. No. 147,318
5 Claims. (Cl. 73—15.4)

This invention relates to a device in which the microhardness of materials is instantly determined in such a way that a test material, inserted centrally of an electric heating unit situated in an evacuated region, is slowly elevated in temperature and, while being microscopically examined as to its physical structure, is given a required position by operating an adjusting and a fine adjusting shaft, then making an indentation under a fine applied load at a certain desired temperature, whereupon the electric heating unit is rotated through an angle, for example of 50°, to bring the test material or specimen under a measuring microscope positioned outside an observation window so that the hardness of the material while it is at the elevated temperature and within the evacuated region can be measured and determined by the microscope.

The conventional way of determining the hardness of materials at elevated temperatures goes no further than the simple production of indentations by impressing the indenter end of the Vickers, Rockwell or other sclerometers, on the surface of test specimens in evacuated regions with a certain force. The test specimens which have been indented in evacuated, and highly elevated temperature, regions are then taken out, the air-tight evacuated regions being restored to ambient atmospheric pressure and the high temperature to the ambient temperature, into the open atmosphere and positioned under the measuring microscope to measure the size of the indentations.

In such conventional mode of procedure, three points are to be noted:

(a) When a metal is heated up to a high temperature and indented, it is impossible to see microscopically the change it has undergone in the physical structure of the metal and to identify the location of the impressed indentation, or to predetermine the location where the indentation should be made;

(b) The indentation with a load is measured in the ambient atmosphere, i.e., at a point outside the evacuated region, whilst the action of indentation takes place in the evacuated region; friction or the atmospheric pressure difference possible in the air-tight packing means lying between the external ambient region and the internal evacuated region, results in errors in the measurement of the load applied; and (c) The major defect is the impossibility of measuring to determine the true size of the impressed indentation or the true hardness in high temperature, by measuring the size of the impressed indentation after the metal has cooled down from the original high temperature almost to the ambient temperature because of such factors encountered as errors due to the thermal expansion of the metal at the transformation point, etc., for all the later corrections made on the basis of calculated values. And, moreover, such operations as evacuation elevating the temperature, etc., involve difficulties and bring with them much loss in operational efficiency.

With the wide progress of modern science, a wide variety of metallic materials, such as are used in artificial moons, jet engines, high-speed turbines, etc., are used at high temperatures, for example, of the order of 1000° to 1300° C. Many people are currently engaged in the study of the physical structure, at the heat resistance and the strength of materials used at high temperature.

Generally, metals, on being slowly elevated in temperature, change their physical structure and finally melt. Some metals, on being elevated in temperature in ambient atmosphere, are oxidized sufficiently to lose their original physical structure.

The present invention relates to a device in which the microhardness is instantaneously determined in such a way that a test specimen is slowly elevated in temperature and, while it is microscopically examined in its physical structure by positioning the specimen in a required position at the elevated temperature, confirming the required position with the aid of a microscope, and, in such confirmed position indenting the specimen under the weight of a fine load, and then measuring by the microscope the size of the indentation on the material while it is still at the high temperature. And, the method of impressing the indentation may be in accordance with the particular inventive system of the present inventor for changing loads in high temperature microhardness testers, for which patent application Serial Number 147,310, filed simultaneously herewith, to which reference is made.

Figure 3:
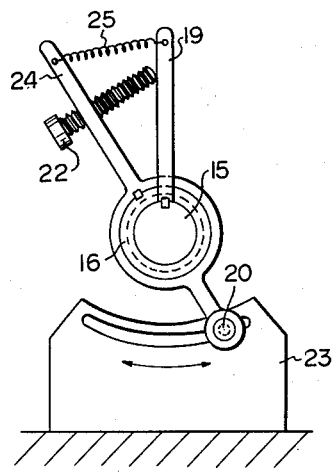
FIGURE 3 is an enlarged partial side-view for the handling assembly.

Referring now to the drawing of the illustrative preferred embodiment of the present invention, in the central hollow interior region of frame body 1 is placed an indenter shaft 2 with its pointed end 2', and the region is made air-tight with packing 4, provided between said shaft and external scale graduated nut 3 threaded on the portion of the casing housing the weights 5 and the indenter shaft 2. Weights 5 are positioned as to lie about indenter shaft 2 above its pointed end 2', said weights 5 being movable upward and downward by means of load supported plate 7, whose upright columnar part 7' is interlocked in action with shaft 6 operable by oil pressure and mounted externally to the left (FIG. 2) of the frame body. Below indenter shaft 2 is provided electric furnace 8, in the center of which is inserted test material 9, which may be slowly heated by heating coil 10 fed and controlled by a power source connected to terminals 11, and the elevated temperature of the test material is measured and determined by connecting terminals 12 with a thermoelectric thermometer. An observation window 13 of heat resistant glass is provided air-tight and aslant for example some 50° with the side of the central part of frame body 1, the window allowing free opening and shutting for the test specimen to be inserted and withdrawn. 14 designates an objective of a high temperature measuring microscope facing the observation window. The bottom of electric furnace 8 is connected with end 15' of rectangular section of the fine adjusting shaft 15, around which is fitted sleeve 16, the left end (FIG. 1) of which represents adjusting shaft 16', the left end of which lies in contact with inner end 17' of adjusting screw 17 by means of compression spring 18. Fine adjusting shaft 15 has a fine adjusting wheel 19 secured at its right end.

Member 24 is affixed by means of key, etc., on sleeve 16 and has in-threaded handle 20. Fine adjusting lever 19 is L-shaped, of which the arm parallel to fine adjusting shaft 15 is in overlying relationship with the arm of member 24 parallel to adjusting shaft 15 (see FIGURES 1 and 3). In the central portion of said arm of member 24 is in-threaded adjusting screw 22, whose end lies in contact with said arm of fine adjusting lever 19. As seen in FIGURE 3, the arms of member 24 and of fine adjusting lever 19, in overlying relationship with each other, are pulled by spring 25 toward each other.

Figure 2:
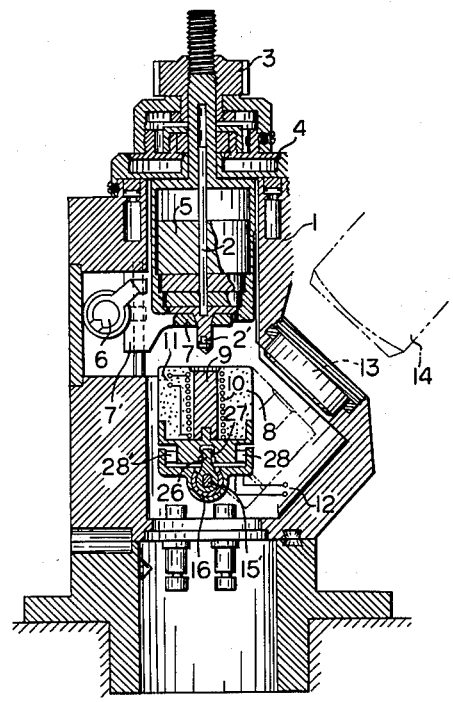
FIGURE 2 is another longitudinal sectional view of the embodiment of FIGURE 1 as viewed at 90° from FIGURE 1.
Figure 1:
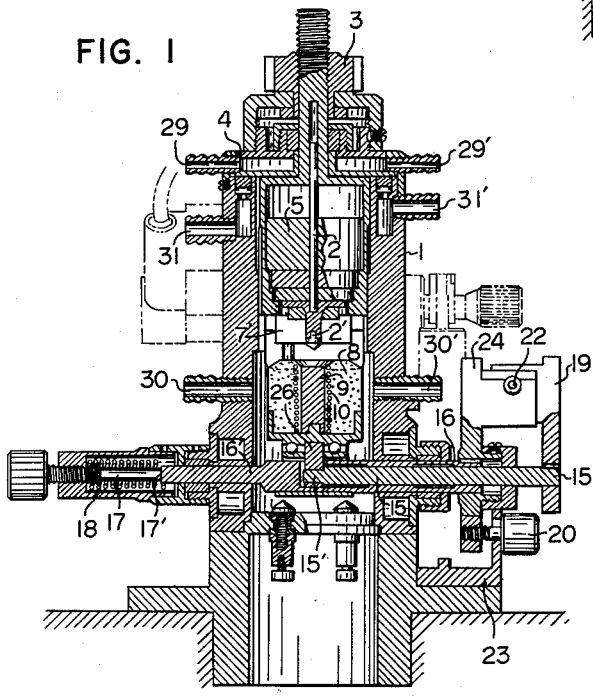
FIGURE 1 is a longitudinal sectional view of a device for measuring microhardness of materials in high temperature in an evacuated region as a preferred embodiment of the present invention.

By turning round adjusting screw 17, adjusting shaft 16' may be shifted right and left in the relationship shown in FIGURE 1. FIGURE 3 shows the relative position of handle 20, when test specimen 9 is positioned below indenter shaft 2. To tilt test specimen 9 to the position of observation as shown in dotted lines in FIGURE 2, handle 20 is loosened and shifted along the guide slot leftward in fixed plate 23 (FIGURES 1 and 3). Member 24 turns round, then clockwise, and with it, fine adjusting lever 19, being pushed by the end of adjusting screw 22, turns round clockwise through the same displacement angle, too. Because of the structural design shown in FIGURE 2, sleeve 16 and fine adjusting shaft 15 rotate through the same displacement angle, with the result of test specimen 9 being tilted, for example by 50°, to reach the observation position. A slight clockwise rotation of adjusting screw 22 in FIGURE 3 brings about another clockwise movement of adjusting lever 19 with its end, resulting in yet another clockwise movement of rectangular section end 15' of fine adjusting shaft 15 in FIGURE 2, there, encircling piece 26 for rectangular section end 15' pushes projection 27 of the base of the furnace 8 to the right, the rest for test specimen 9 thus being shifted rightward as seen in FIGURE 2; the range of the shift rightward and lefward covering the width of the space in gaps 28 and 28'.

The operation of the device is described in the following. In testing and determining the hardness of a material elevated in temperature and undergoing changes in its physical structure, sleeve 16, as described, is rotated away, for example by 50°, from the plane of window 13 so as to have the test specimen 9, lie just below indenter end 2' to be indented. The indentation is impressed when supporter plate 7, which carries weights 5, is caused to descend, the load acting upon test specimen 9 through the medium of indenter end 2'. The descent of plate 7, that is, the descent speed of indenter end 2', is determined by rotary speed of shaft 6, the speed of the descent of support plate 7 being controlled by the oil pressure from outside the frame body in the ambient atmosphere (illustration omitted). With electric furnace 8, containing the test specimen, being returned to window 13, the test specimen may, as it is still at the high temperature, have its indentation measured and its hardness instantly determined by microscope 14. Pairs of pipes 29, 29' and 30, 30' designate respectively connectors for vacuum piping, and pair 31, 31' those for draining the cooling water. Additionally it is noted that the system for changing loads is, as above stated, the same as that fully described in the particular description of the inventive system for sclerometer for hardness testing of materials at high temperature in evacuated regions of my above identified co-pending application.

What I claim is:

1. An apparatus for observing and measuring the microhardness of test specimens at high temperatures in a frame body having an evacuated region and a fixed base an evacuated region comprising an indenter within the evacuated region, means for selectively loading the indenter with weights within the evacuated region, an electrical heater within the evacuated region for supporting a test specimen for indentation by the indenter, a peep aperture in one wall of the frame body, a normally closed transparent closure for the peep hole aperture, means for selectively shifting the position of the test specimen relative to the indenter to receive the impact of the indenter, means for rotating the heater selectively from alignment with the indenter to alignment with the peep aperture, a measuring microscope in alignment with and externally the peep aperture for measuring the indentation of the test specimen produced by an impact of the indenter with the specimen remaining in the heater.

2. The apparatus according to claim 1 in which the means for selectivly shifting the position of the test specimen relative to the indenter comprises a pair of laterally aligned movable elements within the frame body above the base thereof, one of the pair of movable elements supporting the heater, and individual rotatable shaft means cooperating with the respective movable elements of the pair, each rotatable shaft means extending externally from the frame body.

3. The apparatus according to claim 1 in which the means for selectively loading the indenter with weights includes a support plate extending into the evacuated region from externally the frame body, the support plate being hydraulically movable parallel to the indenter to permit the weight-loaded indenter to descend onto the test specimen and to ascend and restore to the position in which the plate supports the weights.

4. The apparatus according to claim 1 in which each rotatable shaft means includes a rotatable shaft and a sleeve coaxial with and actuated by the rotation of the shaft, and a fine adjustment lever is affixed to the portion of one of the shafts external to the frame body for shifting the movable element of the pair supporting the heater.

5. The apparatus according to claim 1 in which the electrical heater is in the form of an elongated vertical coil of an internal diameter snugly to receive and hold the test specimen in each rotated position of the heater in alignment with the indenter and in alignment with the peep aperture.

References Cited by the Examiner
UNITED STATES PATENTS

| | | | |
|---|---|---|---|
| 2,353,891 | 7/44 | Gruntorad | 269—71 |
| 2,573,542 | 10/51 | Cherry | 269—71 |
| 2,748,597 | 6/56 | Kooistra | 73—15.6 |
| 2,986,922 | 6/61 | Garofalo et al. | 73—15.4 |

FOREIGN PATENTS

| | | |
|---|---|---|
| 757,578 | 9/56 | Great Britain. |

RICHARD C. QUEISSER, Primary Examiner.

DAVID SCHONBERG, Examiner.